(12) United States Patent
Wu et al.

(10) Patent No.: US 11,581,994 B2
(45) Date of Patent: Feb. 14, 2023

(54) METHOD AND DEVICE IN UE AND BASE STATION USED FOR WIRELESS COMMUNICATION

(71) Applicants: Keying Wu, Shanghai (CN); Xiaobo Zhang, Shanghai (CN); Lin Yang, Shanghai (CN)

(72) Inventors: Keying Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/516,734

(22) Filed: Nov. 2, 2021

(65) Prior Publication Data
US 2022/0060296 A1 Feb. 24, 2022

Related U.S. Application Data

(63) Continuation of application No. 16/503,482, filed on Jul. 4, 2019, now Pat. No. 11,212,049.

(30) Foreign Application Priority Data
Jul. 5, 2018 (CN) .......................... 201810728731.6

(51) Int. Cl.
*H04L 5/00* (2006.01)
*H04W 72/04* (2023.01)

(52) U.S. Cl.
CPC .......... *H04L 5/0041* (2013.01); *H04L 5/0005* (2013.01); *H04W 72/042* (2013.01); *H04W 72/0493* (2013.01)

(58) Field of Classification Search
CPC .... H04L 5/0041; H04L 5/005; H04W 72/042; H04W 72/0493
See application file for complete search history.

(56) References Cited

U.S. PATENT DOCUMENTS

2019/0141693 A1* 5/2019 Guo ..................... H04W 72/042
2019/0281587 A1* 9/2019 Zhang ................... H04W 72/10
(Continued)

FOREIGN PATENT DOCUMENTS

| CN | 101960736 A | 1/2011 |
|---|---|---|
| CN | 102045140 A | 5/2011 |
| CN | 107659373 A | 2/2018 |

OTHER PUBLICATIONS

First Office Action received in application No. CN201810728731.6 dated Oct. 11, 2021.
(Continued)

*Primary Examiner* — Saad A. Waqas

(57) ABSTRACT

The present disclosure provides a method and a device in a UE and a base station for wireless communication. The UE receives a first signaling in a first resource element set and a first radio signal. The first resource element set determines a first information set out of M information sets; wherein M is equal to 2; the first resource element set comprises a positive integer number of resource element(s); any information set of the M information sets comprises a positive integer number of information element(s); any information element in the M information sets is a transmission configuration indication state; any information element of the integer number of information element(s) comprises a first type index and a second type index set, a second type index set comprises one second type index or multiple second type indices. The above method helps reduce overhead for scheduling signaling.

16 Claims, 12 Drawing Sheets

First information set

| First type index | Second type index set |
|---|---|
| 0 | Reference signal#(0,0)<br>Reference signal#(0,1) |
| 1 | Reference signal#(1,0) |
| ⋮ | ⋮ |
| x | Reference signal#(x,0)<br>Reference signal#(x,1) |
| ⋮ | ⋮ |

First information element

(56) References Cited

U.S. PATENT DOCUMENTS

| | | | | |
|---|---|---|---|---|
| 2019/0297603 A1* | 9/2019 | Guo | ............... | H04W 72/046 |
| 2019/0349964 A1* | 11/2019 | Liou | ............... | H04W 72/046 |
| 2019/0379506 A1* | 12/2019 | Cheng | ............... | H04L 1/0026 |
| 2020/0366446 A1* | 11/2020 | Matsumura | ........... | H04L 5/0007 |
| 2021/0022128 A1* | 1/2021 | Chen | ............... | H04W 72/046 |

OTHER PUBLICATIONS

First Search Report received in application No. CN201810728731.6 dated Sep. 29, 2021.

* cited by examiner

First information set

| First type index | Second type index set |
|---|---|
| 0 | Reference signal#(0,0)<br>Reference signal#(0,1) |
| 1 | Reference signal#(1,0) |
| ⋮ | ⋮ |
| x | Reference signal#(x,0)<br>Reference signal#(x,1) |
| ⋮ | ⋮ |

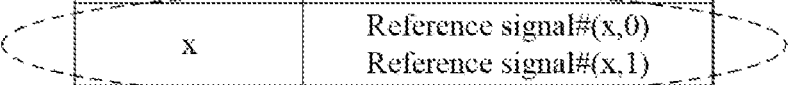
First information element

FIG.10

First information set

| First type index | Second type index set |
|---|---|
| 0 | Reference signal#(0,0)<br>Reference signal#(0,1) |
| 1 | Reference signal#(1,0) |
| ⋮ | ⋮ |
| x | Reference signal#(x,0) |
| ⋮ | ⋮ |

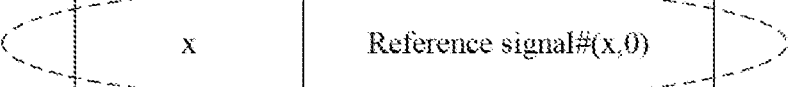
First information element

FIG. 11

METHOD AND DEVICE IN UE AND BASE STATION USED FOR WIRELESS COMMUNICATION

CROSS-REFERENCE TO RELATED APPLICATION

This application is a continuation of U.S. patent application Ser. No. 16/503,482, filed on Jul. 4, 2019, which claims the priority benefit of Chinese Patent Application Serial Number 201810728731.6, filed on Jul. 5, 2018, the full disclosure of which is incorporated herein by reference.

BACKGROUND

Technical Field

The present disclosure relates to methods and devices in wireless communication systems, and in particular to a method and a device in a wireless communication system that supports multiple antennas.

Related Art

Massive Multi-Input Multi-Output (MIMO) becomes a hot topic when studying next generation mobile communications. For the massive MIMO, multiple antennas based on beamforming form a narrow beam which points to a particular direction to improve the quality of communication. Since a beam formed by beamforming of multiple antennas is usually narrow, beams from both sides of communication need to be aligned for effective communication. To ensure that a User Equipment (UE) is able to receive or transmit data using the right beam, a concept of Transmission Configuration Indication-State (TCI-State) is introduced in 3rd Generation Partner Project (3GPP) Radio Access Network (RAN) 1, which means transmitting indication information of TCI-State in scheduling information to indicate to the UE what spatial receive (Rx) parameter shall be used for receiving downlink data. In order to reduce signaling overhead, a base station is supposed to indicate TCI-State in a preconfigured TCI-State set.

Multiple Transmitter Receiver Points (TRP) or panels can serve a UE simultaneously so as to improve robustness of communication and transmission rate of a single UE. Different TRPs/panels utilize different beams to target the UE to form multiple beam pairs. The plurality of TRPs/panels may transmit the same data to improve communication reliability of the UE, or may transmit varied data to enhance the throughput of the UE.

SUMMARY

The inventors have found through researches that since TRPs/panels are usually non-Quasi Co-Located (QCL), different beams will be employed when these TRPs/panels are in communication with one same UE. Applying a same TCI-State set to different TRPs/panels will increase a number of TCI-States comprised in the TCI-State set, which in turn increases signaling overhead for TCI-State indication in a scheduling signaling, or, on the contrary, decreases a number of TCI-States that can be used in each TRP/panel, hence a loss of scheduling flexibility.

In view of the above problem, the present disclosure provides a solution. It should be noted that the embodiments of a User Equipment in the present disclosure and the characteristics in the embodiments may be applied to a base station if no conflict is incurred, and vice versa. The embodiments of the present disclosure and the characteristics in the embodiments may be mutually combined if no conflict is incurred.

The present disclosure provides a method in a User Equipment (UE) for wireless communication, comprising:
receiving a first signaling in a first resource element set; and
receiving a first radio signal;
wherein the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one second type index or multiple second type indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the first radio signal.

In one embodiment, a problem needed to be solved in the present disclosure is how to reduce the overhead for TCI-State indication in a scheduling signaling under the condition that a UE is served by multiple TRPs/panels. The above method solves this problem by configuring different TCI-State sets to each TRP/panel and implicitly indicating these TCI-State sets via time-frequency resources occupied by the scheduling signaling.

In one embodiment, the above method is characterized in that the M information sets are targeted at TCI-State sets of various TRPs/panels, scheduling signaling from each TRP/panel occupies a different CORESET or search space, therefore, the UE can determine a TCI-State set corresponding to the first radio signal based on the first resource element set, and also a TCI-State corresponding to the first radio signal based on the first field of the first signaling.

In one embodiment, the above method is advantageous in that each information set of the M information sets only needs to comprise TCI-State probably used in a corresponding TRP/panel rather than TCI-State probably used in other TRPs/panels, so that overhead for the first field of the first signaling is reduced.

In one embodiment, the above method is advantageous in that time-frequency resources occupied by the first signaling is used for implicitly indicating the first information set, thus reducing signaling overhead.

According to one aspect of the present disclosure, wherein a number of bits comprised in the first field of the first signaling is related to the first information set.

In one embodiment, the above method is advantageous in that a number of bits used for TCI-State indication in a scheduling signaling within each CORESET or search space can be adjusted upon request, thereby further reducing signaling overhead.

According to one aspect of the present disclosure, wherein at least one transmitting antenna port of the first radio signal and at least one transmitting antenna port of a reference signal identified by a second type index comprised in the first information element are quasi-co-located.

According to one aspect of the present disclosure, wherein for any given information set in the M information sets, a number of bits in the first information used for indicating any given first type index in the given information set is less than a number of bits in the first information used for indicating a second type index in a second type index set corresponding to the given first type index.

In one embodiment, the above method is advantageous in that overhead of the first field of the first signaling is reduced.

According to one aspect of the present disclosure, wherein the first resource element set is a resource element set of M1 resource element sets, any resource element set of the M1 resource element sets corresponds to an information set of the M information sets; the M1 is a positive integer greater than 1.

According to one aspect of the present disclosure, comprising:
receiving first information;
wherein the first information indicates the M information sets.

According to one aspect of the present disclosure, comprising:
receiving second information;
wherein the second information indicates a correspondence relationship between the M1 resource element sets and the M information sets.

The present disclosure provides a method in a base station for wireless communication, comprising:
transmitting a first signaling in a first resource element set; and
transmitting a first radio signal;
wherein the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one second type index or multiple second type indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the first radio signal.

According to one aspect of the present disclosure, wherein a number of bits comprised in the first field of the first signaling is related to the first information set.

According to one aspect of the present disclosure, wherein at least one transmitting antenna port of the first radio signal and at least one transmitting antenna port of a reference signal identified by a second type index comprised in the first information element are quasi-co-located.

According to one aspect of the present disclosure, wherein for any given information set in the M information sets, the number of bits in the first information used for indicating any given first type index in the given information set is less than the number of bits in the first information used for indicating a second type index in a second type index set corresponding to the given first type index.

According to one aspect of the present disclosure, wherein the first resource element set is a resource element set of M1 resource element sets, any resource element set of the M1 resource element sets corresponds to an information set of the M information sets, the M1 is a positive integer greater than 1.

According to one aspect of the present disclosure, comprising:
transmitting first information;
wherein the first information indicates the M information sets.

According to one aspect of the present disclosure, comprising:
transmitting second information;
wherein the second information indicates a correspondence relationship between the M1 resource element sets and the M information sets.

The present disclosure provides a UE for wireless communication, comprising:
a first receiver, receiving a first signaling in a first resource element set; and
a second receiver, receiving a first radio signal;
wherein the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one second type index or multiple second type indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the first radio signal.

In one embodiment, the above UE for wireless communication is characterized in that the number of bits comprised in the first field of the first signaling is related to the first information set.

In one embodiment, the above UE for wireless communication is characterized in that at least one transmitting antenna port of the first radio signal and at least one transmitting antenna port of a reference signal identified by a second type index comprised in the first information element are quasi-co-located.

In one embodiment, the above UE for wireless communication is characterized in that for any given information set in the M information sets, the number of bits in the first information used for indicating any given first type index in the given information set is less than the number of bits in the first information used for indicating a second type index in a second type index set corresponding to the given first type index.

In one embodiment, the above UE for wireless communication is characterized in that the first resource element set is a resource element set of M1 resource element sets, any resource element set of the M1 resource element sets corresponds to an information set of the M information sets, the M1 is a positive integer greater than 1.

In one embodiment, the above UE for wireless communication is characterized in that the second receiver further receives first information; wherein the first information indicates the M information sets.

In one embodiment, the above UE for wireless communication is characterized in that the second receiver further receives second information; wherein the second information indicates a correspondence relationship between the M1 resource element sets and the M information sets.

The present disclosure provides a base station for wireless communication, comprising:

a first transmitter, transmitting a first signaling in a first resource element set; and a second transmitter, transmitting a first radio signal;

wherein the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one second type index or multiple second type indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the first radio signal.

In one embodiment, the above base station for wireless communication is characterized in that the number of bits comprised in the first field of the first signaling is related to the first information set.

In one embodiment, the above base station for wireless communication is characterized in that at least one transmitting antenna port of the first radio signal and at least one transmitting antenna port of a reference signal identified by a second type index comprised in the first information element are quasi-co-located.

In one embodiment, the above base station for wireless communication is characterized in that for any given information set in the M information sets, the number of bits in the first information used for indicating any given first type index in the given information set is less than the number of bits in the first information used for indicating a second type index in a second type index set corresponding to the given first type index.

In one embodiment, the above base station for wireless communication is characterized in that the first resource element set is a resource element set of M1 resource element sets, any resource element set of the M1 resource element sets corresponds to an information set of the M information sets, the M1 is a positive integer greater than 1.

In one embodiment, the above base station for wireless communication is characterized in that the second transmitter further transmits first information; wherein the first information indicates the M information sets.

In one embodiment, the above base station for wireless communication is characterized in that the second transmitter further transmits second information; wherein the second information indicates a correspondence relationship between the M1 resource element sets and the M information sets.

In one embodiment, the present disclosure has the following advantages over conventional schemes:

Under the condition that a UE is served by multiple TRPs/panels, different TCI-State sets are configured to each TRP/panel, each TCI-State set only needs to comprise TCI-State related to a corresponding TRP/panel rather than TCI-States related to other TRPs/panels, thus reducing signaling overhead for indicating TCI-State in scheduling information.

Through a CORESET or a search space where a scheduling signaling is located, a TCI-State set employed by the scheduling signaling is implicitly indicated, thereby reducing signaling overhead.

BRIEF DESCRIPTION OF THE DRAWINGS

Other features, objects and advantages of the present disclosure will become more apparent from the detailed description of non-restrictive embodiments taken in conjunction with the following drawings:

FIG. 10 illustrates a schematic diagram of a first information set according to one embodiment of the present disclosure;

FIG. 11 illustrates a schematic diagram of a first information set according to one embodiment of the present disclosure;

DESCRIPTION OF THE EMBODIMENTS

Embodiment 1

Figure 1:
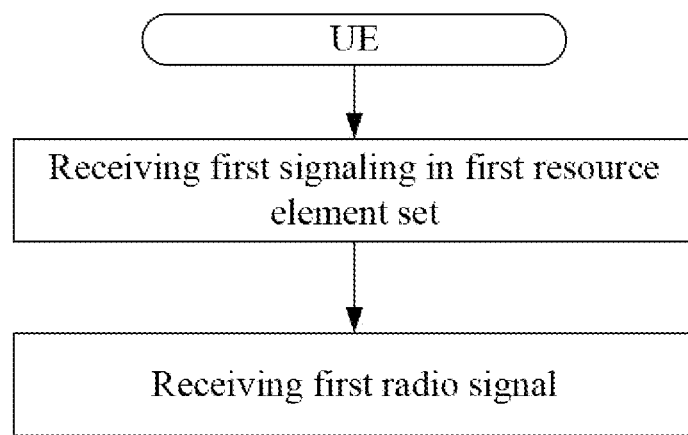
FIG. 1 illustrates a flowchart of a first signaling and a first radio signal according to one embodiment of the present disclosure.

Embodiment 1 illustrates a flowchart of a first signaling and a first radio signal; as shown in FIG. 1.

In Embodiment 1, the UE in the present disclosure receives a first signaling in a first resource element set, and receives a first radio signal. Herein, the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one index or multiple indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the radio signal.

In one embodiment, the first information set is an information set of the M information sets.

In one embodiment, the first information element is an information element in the first information set.

In one embodiment, the first resource element set is a COntrol REsource SET (CORESET).

In one embodiment, the first resource element set is a search space.

In one embodiment, the resource element is RE.

In one embodiment, a resource element occupies a multicarrier symbol in time domain, and occupies a subcarrier in frequency domain.

In one embodiment, the first signaling is a physical layer signaling.

In one embodiment, the first signaling is a dynamic signaling.

In one embodiment, the first signaling only occupies part of resource elements in the first resource element set.

In one embodiment, the first resource element set indicates the first information set out of the M information sets.

In one embodiment, the first resource element set implicitly indicates the first information set out of the M information sets.

In one embodiment, the scheduling information of the first radio signal includes at least one of time domain resources occupied, frequency domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), corresponding Spatial Transmit (Tx) parameters, or Spatial Rx parameters.

In one embodiment, configuration information of DMRS includes one or more of time domain resources occupied, frequency domain resources occupied, code domain resources occupied, RS sequence, mapping mode, DMRS type, cyclic shift, and Orthogonal Cover Code (OCC).

In one embodiment, the M is equal to 2.

In one embodiment, the M is greater than 2.

In one embodiment, a second type index set comprised in any information element in the M information sets comprises 1 or 2 second type indices.

In one embodiment, a number of information elements comprised in any information set of the M information sets is greater than 1.

In one embodiment, a number of information elements comprised in at least one information set of the M information sets is greater than 1.

In one embodiment, a number of information elements comprised in at least one information set of the M information sets is equal to 1.

In one embodiment, a number of information elements comprised in any information set of the M information sets is no greater than 8.

In one embodiment, at least 2 information elements of the M information sets comprise unequal numbers of information elements.

In one embodiment, at least 2 information elements of the M information sets comprise unequal numbers of second type indices.

In one embodiment, the M information sets include at least 1 given information set, at least 2 information elements in the given information set comprise unequal numbers of second type indices.

In one embodiment, at least one information element in the M information sets comprises a second type index set that only comprises one second type index.

In one embodiment, at least one information element in the M information sets comprises a second type index set that comprises 2 second type indices.

In one embodiment, at least one information element in the M information sets comprises a second type index set that comprises multiple second type indices.

In one embodiment, any information element in the M information sets is a Transmission configuration indication-State (TCI-State). The specific meaning of the TCI-State can be found in 3GPP TS38.214, chapter 5.1.5.

In one embodiment, any information element in the M information sets is a TCI-State configuration. The specific meaning of the TCI-State configuration can be found in 3GPP TS38.214, chapter 5.1.5.

In one embodiment, for any given information element in any given information set of the M information sets, a first type index comprised in the any given information element is an index of the any given information element in the any given information set.

In one embodiment, for any given information element in any given information set of the M information sets, a first type index comprised in the any given information element is an index of the any given information element in all information elements comprised in the any given information set.

In one embodiment, any second type index in the M information sets identifies a reference signal resource.

In one subembodiment of the above embodiment, the reference signal resource is a Channel-State Information Reference Signal (CSI-RS) resource.

In one subembodiment of the above embodiment, the reference signal resource is a Synchronization Signal/Physical Broadcast CHannel (SS/PBCH) block resource.

In one subembodiment of the above embodiment, the reference signal resource is a downlink reference signal resource.

In one embodiment, any second type index in the M information sets identifies a reference signal.

In one subembodiment of the above embodiment, the reference signal is a CSI-RS.

In one subembodiment of the above embodiment, the reference signal is an SS/PBCH block.

In one subembodiment of the above embodiment, the reference signal is a downlink reference signal.

In one embodiment, any second type index in the M information sets identifies a CSI-RS resource.

In one embodiment, any second type index in the M information sets identifies a CSI-RS.

In one embodiment, at least one second type index in the M information sets identifies an SS/PBCH block resource.

In one embodiment, at least one second type index in the M information sets identifies a CSI-RS resource.

In one embodiment, at least one second type index in the M information sets identifies a CSI-RS.

In one embodiment, any second type index in the M information sets is a Channel-state information reference signals Resource Indicator (CRI).

In one embodiment, at least one second type index in the M information sets is SS/PBCH Block Resource Indicator (SSBRI).

In one embodiment, at least one second type index in the M information sets is CRI.

In one embodiment, the reference signal identified by a second type index comprised in the first information element refers to: a reference signal transmitted on a reference signal resource identified by a second type index comprised in the first information element.

In one embodiment, a reference signal resource identified by a second type index comprised in the first information element is reserved to the reference signal identified by a second type index comprised in the first information element.

In one embodiment, a reference signal identified by any given second type index in the M information sets refers to: a reference signal transmitted on a reference signal resource identified by the given second type index.

In one embodiment, for any given second type index in the M information sets, a reference signal resource identified by the given second type index is reserved to a reference signal identified by the given second type index.

In one embodiment, the reference signal identified by a second type index comprised in the first information element includes CSI-RS.

In one embodiment, the reference signal identified by a second type index comprised in the first information element includes SS/PBCH block.

In one embodiment, the phrase that a measurement on a reference signal identified by a second type index comprised in the first information element is used for reception of the radio signal refers to: a measurement on a reference signal identified by a second type index comprised in the first information element is used for determining large-scale properties of a channel that the first radio signal goes through.

In one embodiment, the phrase that a measurement on a reference signal identified by a second type index comprised in the first information element is used for reception of the radio signal refers to: large-scale properties of a channel that the first radio signal goes through can be inferred from large-scale properties of a channel that the reference signal identified by a second type index comprised in the first information element goes through.

In one embodiment, large-scale properties of a channel that the first radio signal goes through is not related to large-scale properties of a channel that the first signaling goes through.

In one embodiment, large-scale properties of a channel that the first radio signal goes through can be inferred from large-scale properties of a channel that the first signaling goes through.

In one embodiment, tci-PresentInDC, a higher-layer parameter in the UE is set as enabled. The specific meaning of the tci-PresentInDCI can be found in 3GPP TS38.214 (V15.2.0), chapter 5.1.5.

In one embodiment, tci-PresentInDCI, a higher layer parameter corresponding to the first resource element set in the UE is set as enabled. The specific meaning of the tci-PresentInDCI can be found in 3GPP TS38.214 (V15.2.0), chapter 5.1.5.

In one subembodiment of the above embodiment, the first resource element set is a CORESET.

In one embodiment, a time interval between an end time for time resources occupied by the first signaling and a start time for time resources occupied by the first radio signal is not less than a first threshold, the first threshold is a non-negative integer.

In one subembodiment of the above embodiment, the first threshold is indicated by a higher-layer parameter Threshold-Sched-Offset, the specific meaning of the Threshold-Sched-Offset can be found in 3GPP TS38.214 (V15.2.0), chapter 5.1.5.

Embodiment 2

Figure 2:
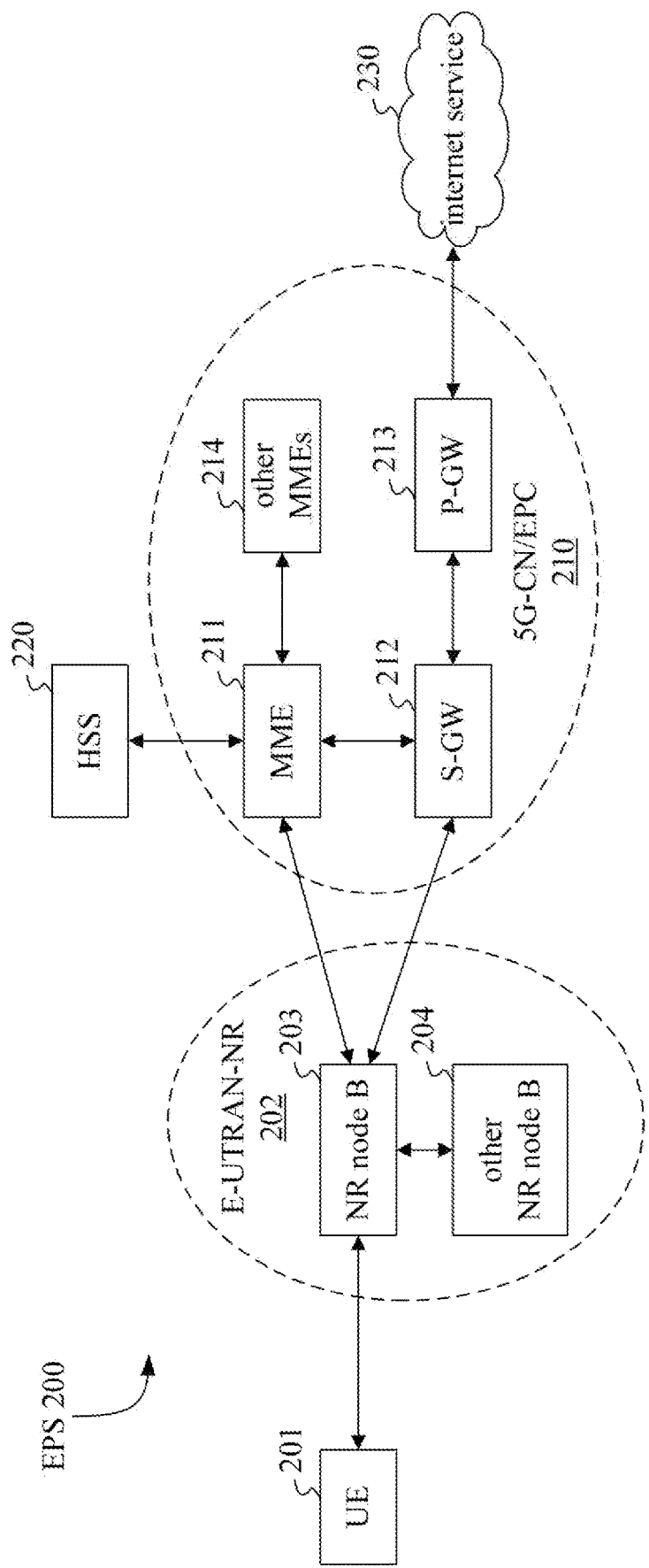
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an Si interface. The 5G-CN/EPC 210 comprises an MME 211, other MMEs 214, a Service Gateway (S-GW) 212 and a Packet Date Network Gateway (P-GW) 213. The MME 211 is a control node for processing a signaling between the UE 201 and the 5G-CN/ EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSSs).

In one embodiment, the gNB 203 corresponds to the base station in the present disclosure.

In one embodiment, the UE 201 corresponds to the UE in the present disclosure.

In one embodiment, the UE 201 supports multi antenna-based wireless communication.

In one embodiment, the gNB 203 supports multi antenna-based wireless communication.

Embodiment 3

Figure 3:
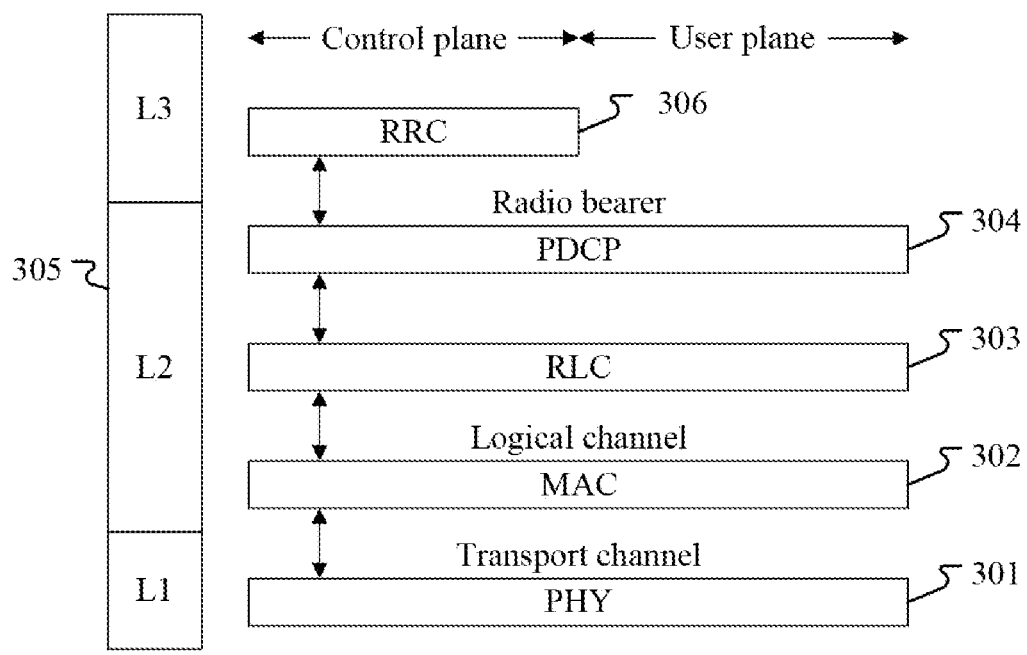
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first signaling in the present disclosure is generated by the MAC sublayer 302.

In one embodiment, the first radio signal in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

Embodiment 4

Figure 4:
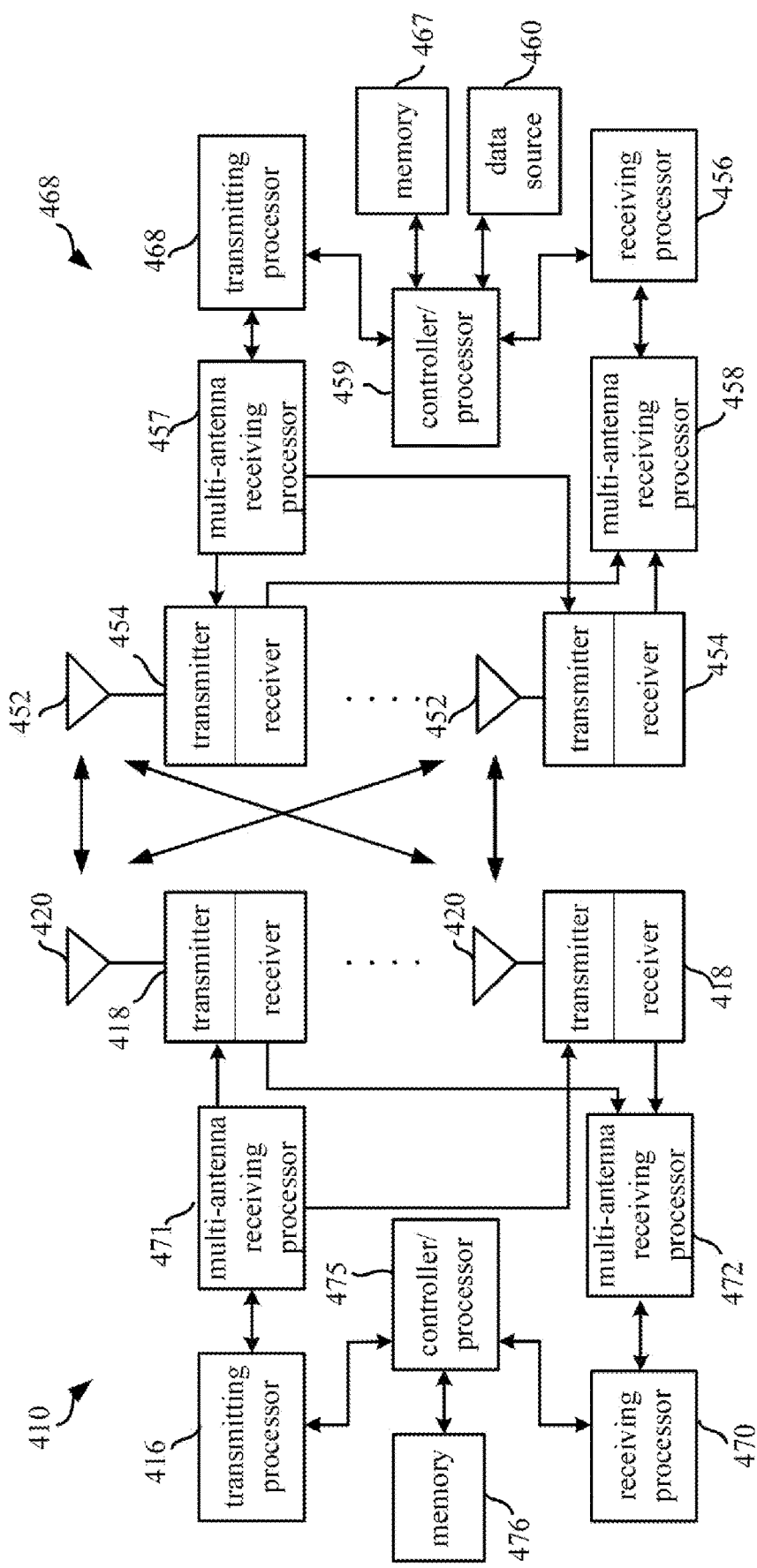
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream from time domain into frequency domain using FFT. In frequency domain, a physical layer data signal and a reference signal are demultiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the first signaling of the present disclosure in the first resource element set of the present disclosure; and receives the first radio signal of the present disclosure. Herein, the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one index or multiple indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the radio signal.

In one embodiment, the UE 450 comprises a memory that stores a computer readable instruction program. The computer readable instruction program generates an action when executed by at least one processor. The action includes: receiving the first signaling of the present disclosure in the first resource element set of the present disclosure; and receiving the first signaling of the present disclosure. Herein, the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one index or multiple indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the radio signal.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first signaling of the present disclosure in the first resource element set of the present disclosure; and transmits the first radio signal of the present disclosure. Herein, the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one index or multiple indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the radio signal.

In one embodiment, the gNB 410 comprises a memory that stores a computer readable instruction program. The computer readable instruction program generates an action when executed by at least one processor. The action includes: transmitting the first signaling of the present disclosure in the first resource element set of the present disclosure; and transmitting the first radio signal of the present disclosure. Herein, the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one index or multiple indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the radio signal.

In one embodiment, the gNB 410 corresponds to the base station in the present disclosure.

In one embodiment, the UE 450 corresponds to the UE in the present disclosure.

In one embodiment, at least one of the antenna 452, the receiver 454, the receiving processor 456, the multi-antenna receiving processor 458, the controller/processor 459, the memory 460, or the data source 467 is used for receiving the first signaling of the present disclosure in the first resource element set of the present disclosure; at least one of the antenna 420, the receiver 418, the receiving processor 416, the multi-antenna transmitting processor 471, the controller/processor 475, or the memory 476 is used for transmitting the first signaling of the present disclosure in the first resource element set of the present disclosure.

In one embodiment, at least one of the antenna 452, the receiver 454, the receiving processor 456, the multi-antenna receiving processor 458, the controller/processor 459, the memory 460, or the data source 467 is used for receiving the first radio signal of the present disclosure; at least one of the antenna 420, the receiver 418, the receiving processor 416, the multi-antenna transmitting processor 471, the controller/processor 475, or the memory 476 is used for transmitting the first radio signal of the present disclosure.

In one embodiment, at least one of the antenna 452, the receiver 454, the receiving processor 456, the multi-antenna receiving processor 458, the controller/processor 459, the memory 460, or the data source 467 is used for receiving the first information of the present disclosure; at least one of the antenna 420, the receiver 418, the receiving processor 416, the multi-antenna transmitting processor 471, the controller/processor 475, or the memory 476 is used for transmitting the first information of the present disclosure.

In one embodiment, at least one of the antenna 452, the receiver 454, the receiving processor 456, the multi-antenna receiving processor 458, the controller/processor 459, the memory 460, or the data source 467 is used for receiving the second information of the present disclosure; at least one of the antenna 420, the receiver 418, the receiving processor 416, the multi-antenna transmitting processor 471, the controller/processor 475, or the memory 476 is used for transmitting the second information of the present disclosure.

Embodiment 5

Figure 5:
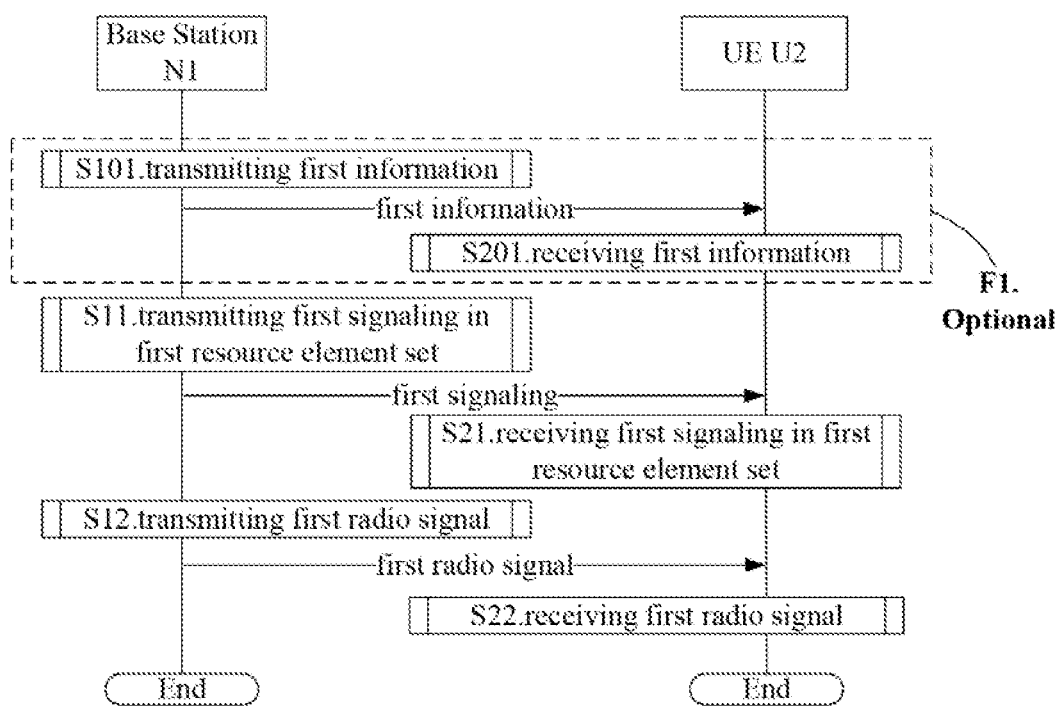
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2. In FIG. 5, steps in box F1 are optional.

The base station N1 transmits first information in step S101; transmits a first signaling in a first resource element set in step S11; and transmits a first radio signal in step S12.

The UE U2 receives first information in step S201; receives a first signaling in a first resource element set in step S21; and receives a first radio signal in step S22.

In Embodiment 5, the first resource element set is used by the U2 for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one index or multiple indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used by the U2 for reception of the radio signal. The first information indicates the M information sets.

In one embodiment, the number of bits comprised in the first field of the first signaling is related to the first information set.

In one embodiment, at least one transmitting antenna port of the first radio signal and at least one transmitting antenna port of a reference signal identified by a second type index comprised in the first information element are quasi-co-located.

In one embodiment, the Quasi Co-Located is QCL. The specific meaning of the QCL can be found in 3GPP TS38.211, chapter 4.4 and 3GPP TS38.214, chapter 5.1.5.

In one embodiment, for any given information set in the M information sets, the number of bits in the first information used for indicating any given first type index in the given information set is less than the number of bits in the first information used for indicating a second type index in a second type index set corresponding to the given first type index.

In one embodiment, a number of bits used for indicating the given first type index in the first information is a minimum positive integer not less than the logarithm of B1 with base 2, the B1 is a number of information elements comprised in the given information set, the B1 is a positive integer.

In one embodiment, a given second type index is a second type index of a second type index set corresponding to the given first type index; a reference signal identified by the given second type index is a candidate reference signal of B2 candidate reference signals, the B2 is a positive integer greater than 1; a number of bits used for indicating the given second type index in the first information is a minimum positive integer not less than the logarithm of B2 with base 2.

In one embodiment, the B2 is greater than the B1.

In one embodiment, the first information is carried by a higher-layer signaling.

In one embodiment, the first information is carried by a Radio Resource Control (RRC) signaling.

In one embodiment, the first information is carries by a Medium Access Control layer Control Element (MAC CE) signaling.

In one embodiment, the first information is carried by one signaling.

In one embodiment, the first information comprises multiple pieces of first sub-information, the multiple pieces of first sub-information are respectively carried by multiple signalings.

In one subembodiment of the above embodiment, the multiple pieces of first sub-information are respectively carried by multiple higher-layer signalings.

In one subembodiment of the above embodiment, the multiple pieces of first sub-information are respectively carried by multiple RRC signalings.

In one embodiment, the first information comprises M pieces of first sub-information, the M pieces of first sub-information are carried by M signalings respectively, the M pieces of first sub-information respectively indicate the M information sets.

In one subembodiment of the above embodiment, the M pieces of first sub-information are respectively carried by M higher-layer signalings.

In one subembodiment of the above embodiment, the M pieces of first sub-information are respectively carried by M RRC signalings.

In one embodiment, the first resource element set is a resource element set of M1 resource element sets, any resource element set of the M1 resource element sets corresponds to an information set of the M information sets; the M1 is a positive integer greater than 1.

In one embodiment, the M is equal to the M1.

In one embodiment, the M is greater than the M1.

In one embodiment, the M is less than the M1.

In one embodiment, the UE in the present disclosure receives second information; the second information indicates a correspondence relationship between the M1 resource element sets and the M information sets.

In one embodiment, the second information respectively indicates a correspondence relationship between each information set of the M information sets and one or more resource element sets of the M1 resource element sets.

In one embodiment, the second information respectively indicates a resource element set of the M1 resource element sets that corresponds to each information set of the M information sets.

In one embodiment, the second information is carried by a higher-layer signaling.

In one embodiment, the second information is carried by an RRC signaling.

In one embodiment, the second information is carried by a MAC CE signaling.

In one embodiment, the second information is carried by one signaling.

In one embodiment, the second information comprises multiple pieces of second sub-information, the multiple pieces of second sub-information are respectively carried by multiple signalings.

In one subembodiment of the above embodiment, the multiple pieces of second sub-information are respectively carried by multiple high-layer signalings.

In one subembodiment of the above embodiment, the multiple pieces of second sub-information are respectively carried by multiple RRC signalings.

In one embodiment, the second information comprises M pieces of second sub-information, the M pieces of second sub-information are carried by M signalings respectively; the M pieces of second sub-information respectively correspond to the M information sets, any piece of second sub-information in the M pieces of second sub-information indicates a resource element set of the M1 resource element sets that corresponds to a corresponding information set.

In one subembodiment of the above embodiment, the M pieces of second sub-information are respectively carried by M higher-layer signalings.

In one subembodiment of the above embodiment, the M pieces of second sub-information are respectively carried by M RRC signalings.

In one embodiment, the second information and the first information are carried by one same signaling.

In one embodiment, the second information and the first information are carried by different signalings.

In one embodiment, the multiple pieces of first sub-information respectively correspond to the multiple pieces of second sub-information, the corresponding first sub-information and second sub-information are carried by a same signaling.

In one embodiment, the M pieces of first sub-information respectively correspond to the M pieces of second sub-information, the corresponding first sub-information and second sub-information are carried by a same signaling.

In one embodiment, the first signaling is transmitted on a downlink physical layer control channel (i.e., a downlink channel that can only be used for bearing a physical layer signaling).

In one embodiment, the downlink physical layer control channel is a Physical Downlink Control CHannel (PDCCH).

In one embodiment, the downlink physical layer control channel is an Enhanced PDCCH (EPDCCH).

In one embodiment, the downlink physical layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

In one embodiment, the first radio signal is transmitted on a downlink physical layer data channel (i.e., a downlink channel that can be used for bearing physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, a transmission channel for the first radio signal is a DownLink Shared Channel (DL-SCH).

In one embodiment, the first information is transmitted on downlink physical data channels (i.e., downlink channels that can be used for bearing physical layer data).

In one embodiment, the first information is transmitted on a downlink physical data channel (i.e., a downlink channel that can be used for bearing physical layer data).

In one embodiment, the first information comprises multiple pieces of first sub-information, the multiple pieces of first sub-information are respectively transmitted on multiple downlink physical layer data channels (i.e., downlink channels that can be used for bearing physical layer data).

In one embodiment, the first information comprises M pieces of first sub-information, the M pieces of first sub-information are respectively transmitted on M downlink physical layer data channels (i.e., downlink channels that can be used for bearing physical layer data); the M pieces of first sub-information indicate the M information sets respectively.

In one embodiment, the second information is transmitted on downlink physical layer data channels (i.e., downlink channels that can be used for bearing physical layer data).

In one embodiment, the second information is transmitted on a downlink physical layer data channel (i.e., a downlink channel that can be used for bearing physical layer data).

In one embodiment, the second information comprises multiple pieces of second sub-information, the multiple pieces of second sub-information are respectively transmitted on multiple downlink physical layer data channels (i.e., downlink channels that can be used for bearing physical layer data).

In one embodiment, the second information comprises M pieces of second sub-information, the M pieces of second sub-information are respectively transmitted on M downlink physical layer data channels (i.e., downlink channels that can be used for bearing physical layer data); the M pieces of second sub-information respectively correspond to M information sets, any piece of second sub-information of the M pieces of second sub-information indicates a resource element set of the M1 resource element set that corresponds to a corresponding information set.

In one embodiment, the multiple pieces of first sub-information respectively correspond to the multiple pieces of second sub-information, the corresponding first sub-information and second sub-information are transmitted on a same downlink physical layer data channel.

In one embodiment, the M pieces of first sub-information respectively correspond to the M pieces of second sub-information, the corresponding first sub-information and second sub-information are transmitted on a same downlink physical layer data channel.

Embodiment 6

Figure 6:
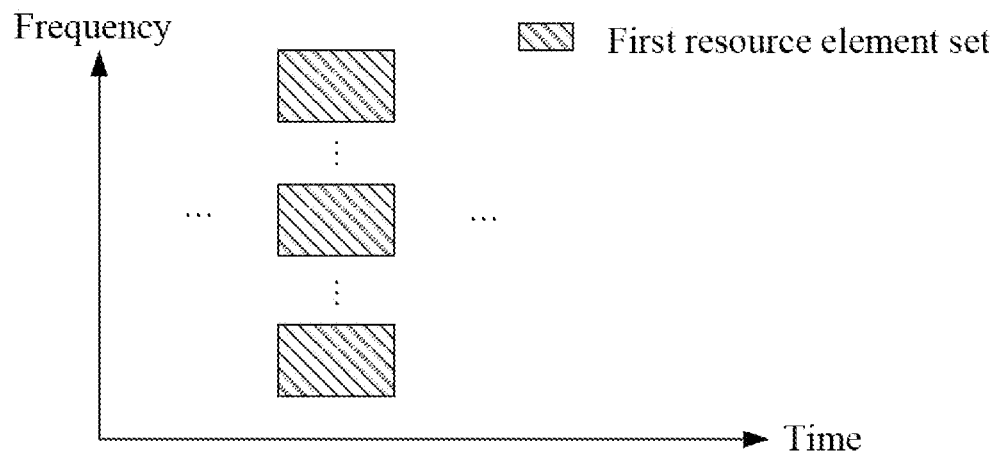
FIG. 6 illustrates a schematic diagram of resource mapping of a first resource element set in time-frequency domain according to one embodiment of the present disclosure.

Embodiment 6 illustrates a schematic diagram of resource mapping of a first resource element set in time-frequency domain; as shown in FIG. 6.

In Embodiment 6, the first resource element set comprises a positive integer number of resource element(s), frequency resources occupied by the first resource element set are non-consecutive. The first resource element set is one of the M1 resource element sets in the present disclosure. In FIG. 6, a box filled with slashes represents the first resource element set.

In one embodiment, the first resource element set is a CORESET.

In one embodiment, the first resource element set is a search space.

In one embodiment, the first resource element set is a PDCCH candidate.

In one subembodiment of the above embodiment, the specific meaning of the PDCCH candidate can be found in 3GPP TS36.213, chapter 9.1.

In one embodiment, the first resource element set is an EPDCCH candidate.

In one subembodiment of the above embodiment, the specific meaning of the EPDCCH candidate can be found in 3GPP TS36.213, chapter 9.1.

In one embodiment, the resource element is RE.

In one embodiment, a resource element occupies a multicarrier symbol on time domain, and occupies a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, time resources occupied by the first resource element set are non-consecutive.

In one embodiment, time resources occupied by the first resource element set are consecutive.

In one embodiment, frequency resources occupied by the first resource element set are non-consecutive.

In one embodiment, any resource element set of the M1 resource element sets is a CORESET.

In one embodiment, any resource element set of the M1 resource element sets is a search space.

In one embodiment, any resource element set of the M1 resource element sets is a PDCCH candidate.

In one embodiment, any resource element set of the M1 resource element sets is an EPDCCH candidate.

In one embodiment, any resource element set of the M1 resource element sets consists of multiple resource elements.

In one embodiment, there exists at least one resource element belonging to two different resource element sets of the M1 resource element sets simultaneously.

In one embodiment, there does not exist a resource element belonging to two different resource element sets of the M1 resource element sets simultaneously.

Embodiment 7

Figure 7:
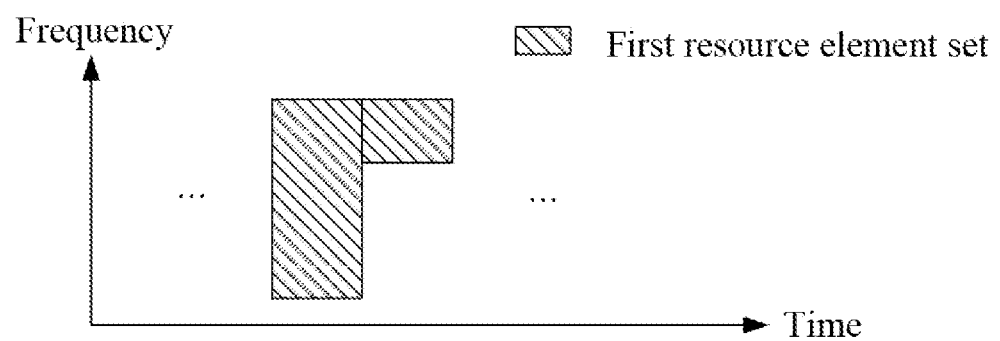
FIG. 7 illustrates a schematic diagram of resource mapping of a first resource element set in time-frequency domain according to one embodiment of the present disclosure.

Embodiment 7 illustrates a schematic diagram of resource mapping of a first resource element set in time-frequency domain; as shown in FIG. 7.

In Embodiment 7, the first resource element set comprises a positive integer number of resource element(s), frequency resources occupied by the first resource element set are consecutive. In FIG. 7, a box filled with slashes represents the first resource element set.

In one embodiment, frequency resources occupied by the first resource element set are consecutive.

Embodiment 8

Figure 8:
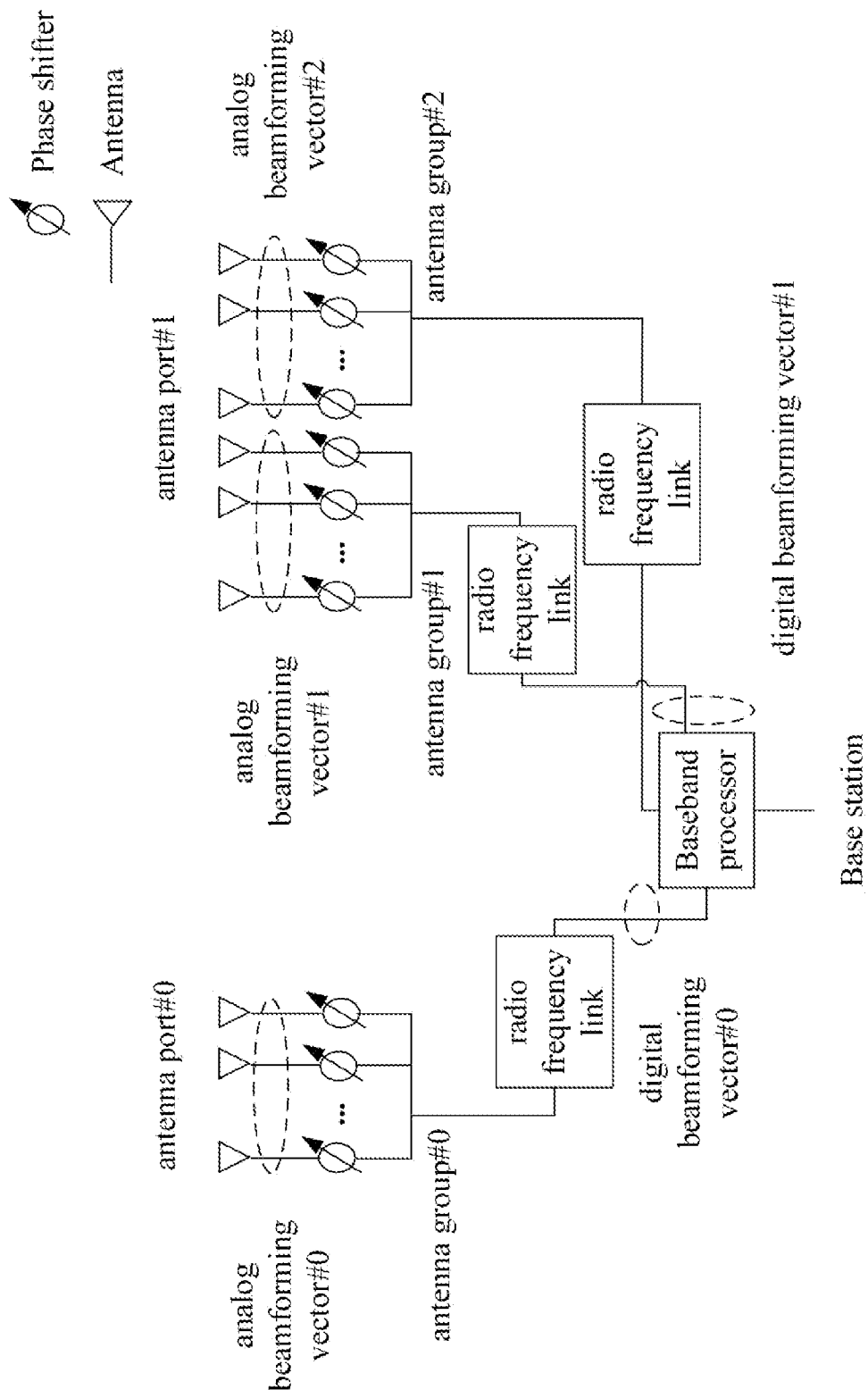
FIG. 8 illustrates a schematic diagram of antenna ports according to one embodiment of the present disclosure.

Embodiment 8 illustrates a schematic diagram of antenna ports; as shown in FIG. 8.

In Embodiment 8, one antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute a beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) comprised in the given antenna port are arranged diagonally to form an analog beamforming matrix corresponding to the given antenna port. Mapping coefficients from the positive integer number of antenna group(s) comprised in the given antenna port to the given antenna port constitute a digital beamforming vector corresponding to the given antenna port. A beamforming vector corresponding to the given antenna port is acquired as a product of the analog beamforming matrix and the digital beamforming vector corresponding to the given antenna port.

FIG. 8 illustrates two antenna ports, namely, antenna port #0 and antenna port #1. Herein, the antenna port #0 consists of antenna group #0, and the antenna port #1 consists of antenna group #1 and antenna group #2. Mapping coefficients from multiple antennas of the antenna group #0 to the antenna port #0 constitute an analog beamforming vector #0; mapping coefficients from the antenna group #0 to the antenna port #0 constitute a digital beamforming vector #0; a beamforming vector corresponding to the antenna port #0 is acquired as a product of the analog beamforming vector #0 and the digital beamforming vector #0. Mapping coefficients from multiple antennas of the antenna group #1 to the antenna port #1 and mapping coefficients from multiple antennas of the antenna group #2 to the antenna port #1 respectively constitute an analog beamforming vector #1 and an analog beamforming vector #2; mapping coefficients from the antenna group #1 and the antenna group #2 to the antenna port #1 constitute a digital beamforming vector #1; a beamforming vector corresponding to the antenna port #1 is acquired as a product of the digital beamforming vector #1 and an analog beamforming matrix formed by the analog beamforming vector #1 and the analog beamforming vector #2 which are diagonally arranged.

In one embodiment, the specific meaning of the antenna port can be found in 3GPP TS36.211, chapter 5.2 and chapter 6.2, or can be found in 3GPP TS38.211, chapter 4.4.

In one embodiment, a small-scale channel parameter of a channel that a radio signal transmitted from one antenna port goes through can be used to infer that of a channel of another radio signal transmitted from the antenna port goes through.

In one embodiment, a small-scale channel parameter of a channel that a radio signal transmitted from one antenna port goes through cannot be used to infer that of a channel of another radio signal transmitted from the antenna port goes through.

In one embodiment, the small-scale channel parameter includes one or more of Channel Impulse Response (CIR), a Precoding Matrix Indicator (PMI), a Channel Quality Indicator (CQI), and a Rank Indicator (RI).

In one embodiment, an antenna port only comprises one antenna group, i.e., one RF chain, for instance, the antenna port #0 in FIG. 8.

In one subembodiment of the above embodiment, the analog beamforming matrix corresponding to the one antenna port is subjected to dimensionality reduction to form an analog beamforming vector, and the digital beamforming vector corresponding to the one antenna port is subjected to dimensionality reduction to form a scaler, a beamforming vector corresponding to the one antenna port is equal to an analog beamforming vector corresponding thereto. For example, the antenna port #0 in FIG. 8 only comprises the antenna port #0, the digital beamforming vector #0 in FIG. 8 is subjected to dimensionality reduction to form a scaler, a beamforming vector corresponding to the antenna port #0 is the analog beamforming vector #0.

In one embodiment, an antenna port comprises multiple antenna groups, i.e., multiple RF chains, for instance, the antenna port #1 in FIG. 8.

In one embodiment, two antenna ports being Quasi Co-Located means that these two antenna ports are QCL, the specific meaning of the QCL can be found in 3GPP TS38.211, chapter 4.4 and 3GPP TS38.214, chapter 5.1.5.

In one embodiment, the phrase that two antenna ports are QCL refers to: large-scale properties of a channel that a radio signal transmitted by one of the two antenna ports goes through can be used to infer large-scale properties of a channel that a radio signal transmitted by the other of the two antenna ports goes through.

In one embodiment, the large-scale properties include one or more of delay spread, Doppler spread, Doppler shift, average gain, average delay, and Spatial Rx parameters.

In one embodiment, Spatial Rx parameters include one or more of a receiving beam, a receiving analog beamforming matrix, a receiving analog beamforming vector, a receiving digital beamforming vector, a receiving beamforming vector, and a Spatial Domain Receive Filter.

Embodiment 9

Figure 9:
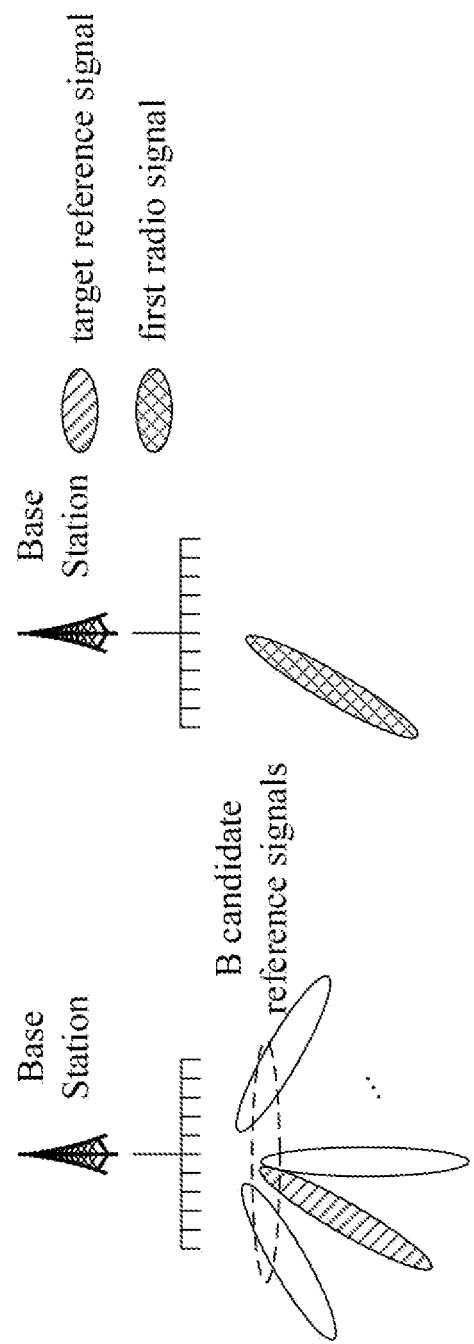
FIG. 9 illustrates a schematic diagram of a measurement on a reference signal identified by a second type index comprised in a first information element being used for reception of a first radio signal according to one embodiment of the present disclosure.

Embodiment 9 illustrates a schematic diagram of a measurement on a reference signal identified by a second type index comprised in a first information element being used for reception of a first radio signal; as shown in FIG. 9.

In Embodiment 9, a target reference signal is a reference signal identified by a second type index comprised in the first information element. A measurement on the target reference signal is used for reception of the first radio signal. At least one transmitting antenna port of the first radio signal and at least one transmitting antenna port of the target reference signal are Quasi Co-Located. The target reference signal is a candidate reference signal of B candidate reference signals, the B is a positive integer greater than 1. In FIG. 9, an ellipse filled with slashes represents the target reference signal, an ellipse filled with crosses represents the first radio signal.

In one embodiment, a measurement on a reference signal identified by any second type index comprised in the first information element is used for reception of the first radio signal.

In one embodiment, the phrase that a measurement on a reference signal identified by (a) second type index(indices) comprised in the first information element is used for reception of the first radio signal refers to: a measurement on a reference signal identified by (a) second type index(indices) comprised in the first information element is used for determining large-scale properties of a channel that the first radio signal goes through.

In one embodiment, the phrase that a measurement on a reference signal identified by (a) second type index(indices) comprised in the first information element is used for reception of the first radio signal refers to: large-scale properties of a channel that the first radio signal goes through can be inferred from large-scale properties of a reference signal identified by (a) second type index(indices) comprised in the first information element.

In one embodiment, the phrase that a measurement on a reference signal identified by (a) second type index(indices) comprised in the first information element is used for reception of the first radio signal refers to: large-scale properties of a channel that the first radio signal goes through are the same as large-scale properties of a reference signal identified by (a) second type index(indices) comprised in the first information element.

In one embodiment, the phrase that a measurement on a reference signal identified by (a) second type index(indices) comprised in the first information element is used for reception of the first radio signal refers to: a measurement on a reference signal identified by (a) second type index(indices) comprised in the first information element is used for determining Spatial Rx parameters corresponding to the first radio signal.

In one embodiment, the phrase that a measurement on a reference signal identified by (a) second type index(indices) comprised in the first information element is used for reception of the first radio signal refers to: Spatial Rx parameters corresponding to the first radio signal can be inferred from Spatial Rx parameters corresponding to a reference signal identified by (a) second type index(indices) comprised in the first information element.

In one embodiment, the phrase that a measurement on a reference signal identified by (a) second type index(indices) comprised in the first information element is used for reception of the first radio signal refers to: Spatial Rx parameters corresponding to a reference signal identified by (a) second type index(indices) comprised in the first information element can be used for receiving the first radio signal.

In one embodiment, the target reference signal is a reference signal identified by any second type index comprised in the first information element.

In one embodiment, a measurement on the target reference signal is used for determining large-scale properties of a channel that the first radio signal goes through.

In one embodiment, large-scale properties of a channel the first radio signal goes through can be inferred from large-scale properties of a channel the target reference signal goes through.

In one embodiment, a measurement on the target reference signal is used for determining Spatial Rx parameters corresponding to the first radio signal.

In one embodiment, Spatial Rx parameters corresponding to the first radio signal can be inferred from Spatial Rx parameters corresponding to the target reference signal.

In one embodiment, one antenna port and another antenna port being Quasi Co-located refers to: the one antenna port and the another antenna port are QCL.

In one embodiment, at least one transmitting antenna port of a reference signal identified by any second type index comprised in the first information element and at least one transmitting antenna port of the first radio signal are QCL.

In one embodiment, at least one transmitting antenna port of a reference signal identified by (a) second type index (indices) comprised in the first information element and at least one transmitting antenna port of DMRS on a PDSCH where the first radio signal is located are QCL.

In one embodiment, any one transmitting antenna port of a reference signal identified by (a) second type index(indices) comprised in the first information element and at least one transmitting antenna port of the first radio signal are QCL.

In one embodiment, any one transmitting antenna port of a reference signal identified by (a) second type index(indices) comprised in the first information element and at least one transmitting antenna port of DMRS on a PDSCH where the first radio signal is located are QCL.

any one transmitting antenna port of a reference signal identified by (a) second type index(indices) comprised in the first information element and any one transmitting antenna port of the first radio signal are QCL.

In one embodiment, any one transmitting antenna port of a reference signal identified by (a) second type index(indices) comprised in the first information element and any one transmitting antenna port of DMRS on a PDSCH where the first radio signal is located are QCL.

In one embodiment, at least one transmitting antenna port of the target reference signal and at least one transmitting antenna port of the first radio signal are QCL.

In one embodiment, any one transmitting antenna port of the target reference signal and at least one transmitting antenna port of the first radio signal are QCL.

In one embodiment, any one transmitting antenna port of the target reference signal and any one transmitting antenna port of the first radio signal are QCL.

In one embodiment, large-scale properties of a channel that the first radio signal goes through are not related to large-scale properties of a channel that the first signaling of the present disclosure goes through.

In one embodiment, large-scale properties of a channel that the first radio signal goes through cannot be inferred from large-scale properties of a channel that the first signaling of the present disclosure goes through.

In one embodiment, Spatial Rx parameters corresponding to the first radio signal are not related to Spatial Rx parameters corresponding to the first signaling of the present disclosure.

In one embodiment, Spatial Rx parameters corresponding to the first radio signal cannot be inferred from Spatial Rx parameters corresponding to the first signaling of the present disclosure.

In one embodiment, any one transmitting antenna port of the first radio signal and any one transmitting antenna port of the first signaling of the present disclosure cannot be assumed to be QCL.

In one embodiment, the target reference signal is a CSI-RS.

In one embodiment, the target reference signal is an SS/PBCH block.

In one embodiment, the B2 candidate reference signals include CSI-RS.

In one embodiment, the B2 candidate reference signals include SS/PBCH block(s).

Embodiment 10

Embodiment 10 illustrates a schematic diagram of a first information set; as shown in FIG. 10.

In Embodiment 10, the first information set is an information set of the M information sets; any one of the M information sets comprises a positive integer number of information element(s), any information element of the positive integer number of information element(s) comprises a first type index and a second type index set, the second type index comprises one or two second type indices. Any first type index in the M information sets is an index of a corresponding information element in an information set to which the corresponding information element belongs. Any second type index in the M information sets identifies a reference signal. The first information element in the present disclosure is an information element of the first information set. An index of the first information element in the first information set is x, the x is a non-negative integer less than a number of information elements comprised in the first information set. A first type index comprised in the first information element is the x. A second type index set comprised in the first information element comprises two second type indices, the two indices identify two reference signals respectively. At least one transmitting antenna port of the first radio signal of the present disclosure and at least one transmitting antenna port of any one of the two reference signals are QCL.

In FIG. 10, indices of the positive integer number of information element(s) in the first information set are #0, #1 . . . , #x, respectively; the i+1-th reference signal comprised in a second type index set in information element #y is described as reference signal #(y, i), wherein the y is a non-negative integer less than the number of information elements in the first information set, the i is equal to 0 or 1. Two reference signals identified by two second type indices of the second type index set comprised in the first information element are reference signal #(x, 0) and reference signal #(x, 1), respectively.

In one embodiment, the first information set is a TCI-State, the specific meaning of the TCI-State can be found in 3GPP TS38.214, chapter 5.1.5.

In one embodiment, the first information set is a TCI-State configuration, the specific meaning of the TCI-State configuration can be found in 3GPP TS38.214, chapter 5.1.5.

In one embodiment, a first type index comprised in the first information element is an index of the first information element in the first information set.

In one embodiment, a first type index comprised in the first information element is an index of the first information element in all information elements comprised in the first information set.

In one embodiment, any second type index in the first information set identifies a reference signal resource.

In one embodiment, any second type index in the first information set identifies a reference signal.

In one embodiment, any second type index in the first information set identifies a CSI-RS resource.

In one embodiment, at least a second type index in the first information set identifies SS/PBCH block resource(s).

In one embodiment, at least a second type index in the first information set identifies a CSI-RS resource.

In one embodiment, any second type index in the first information set identifies a CSI-RS.

In one embodiment, at least a second type index in the first information set identifies an SS/PBCH block.

In one embodiment, at least a second type index in the first information set identifies a CSI-RS.

In one embodiment, any second type index in the first information set is a CRI.

In one embodiment, at least a second type index in the first information set is an SSBRI.

In one embodiment, at least a second type index in the first information set is a CRI.

In one embodiment, a reference signal identified by any given second type index comprised in the first information element is a reference signal transmitted on a reference signal resource identified by the given second type index.

In one embodiment, for any given second type index comprised in the first information element, a reference signal resource identified by the given second type index is reserved to a reference signal identified by the given second type index.

In one embodiment, a second type index set comprised in the first information element comprises two second type indices, the two second type indices identify two reference signals respectively; a first antenna port is a transmitting antenna port of one of the two reference signals, a second antenna port is a transmitting antenna port of the other of the two reference signals, a third antenna port is a transmitting antenna port of the first radio signal; the third antenna port and the first antenna port as well as the second antenna port are mutually QCL, wherein the QCL type between the third antenna port and the first antenna port is different from that between the third antenna port and the second antenna port.

In one subembodiment of the above embodiment, the first antenna port is a transmitting antenna port of the reference signal # (x, 0) in FIG. 10, the second antenna port is a transmitting antenna port of the reference signal # (x, 1) in FIG. 10.

In one subembodiment of the above embodiment, the first antenna port is any one transmitting antenna port of the one of the two reference signals, the second antenna port is any transmitting antenna port of the other of the two reference signals.

In one subembodiment of the above embodiment, at least one transmitting antenna port of DMRS on a PDSCH where the first radio signal is located and the first antenna port as well as the second antenna port are mutually QCL, but correspond to different QCL types.

In one subembodiment of the above embodiment, the QCL type between the third antenna port and the first antenna port is QCL-TypeD.

In one subembodiment of the above embodiment, the QCL type between the third antenna port and the second antenna port is QCL-TypeA.

In one embodiment, the specific meaning of the QCL type can be found in 3GPP TS38.214, chapter 5.1.5.

In one embodiment, the phrase that the QCL type between an antenna port and another antenna port is QCL-TypeD refers to: Spatial Rx parameters of a radio signal transmitted from the one antenna port can be used to infer Spatial Rx parameters of a radio signal transmitted from the another antenna port.

In one embodiment, the phrase that the QCL type between an antenna port and another antenna port is QCL-TypeD refers to: a radio signal transmitted from the one antenna port and a radio signal transmitted from the another antenna port can be received with same Spatial Rx parameters.

In one embodiment, the specific meaning of the QCL-TypeD can be found in 3GPP TS38.214, chapter 5.1.5.

In one embodiment, the phrase that the QCL type between an antenna port and another antenna port is QCL-TypeA refers to: the delay spread, Doppler spread, Doppler shift and average delay of a channel that a radio signal transmitted from the one antenna port goes through can be used to infer the delay spread, Doppler spread, Doppler shift and average delay of a channel that a radio signal transmitted from the another antenna port goes through.

In one embodiment, the phrase that the QCL type between an antenna port and another antenna port is QCL-TypeA refers to: a channel that a radio signal transmitted from the one antenna port goes through and a channel that a radio signal transmitted from the another antenna port goes through have the same delay spread, Doppler spread, Doppler shift and average delay.

Embodiment 11

Embodiment 11 illustrates a schematic diagram of a first information set; as shown in FIG. 11.

In Embodiment 11, the first information element in the present disclosure is an information element of the first information set. An index of the first information element in the first information set is x, the x is a non-negative integer less than the number of information elements comprised in the first information set. A first type index comprised in the first information element is the x. A second type index set comprised in the first information set only comprises one second type index, the one second type index identifies a reference signal. At least one transmitting antenna port of the first radio signal in the present disclosure and at least one transmitting antenna port of the reference signal are QCL.

In FIG. 11, indices of information element(s) in the first information set are #0, #1 . . . , #x, respectively; the i+1-th reference signal comprised in a second type index set in information element #y is described as reference signal #(y, i), wherein the y is a non-negative integer less than the number of information elements in the first information set, the i is equal to 0 or 1. A reference signal identified by one second type index of the second type index set comprised in the first information element is reference signal #(x, 0).

In one embodiment, a second type index set comprised in the first information element only comprises one second type index; a first antenna port is a transmitting antenna port of a reference signal identified by the one second type index, a third antenna port is a transmitting antenna port of the first radio signal; the first antenna port and the third antenna port are QCL.

In one subembodiment of the above embodiment, the first antenna port is a transmitting antenna port of the reference signal #(x, 0) in FIG. 11.

In one subembodiment of the above embodiment, the first antenna port is any transmitting antenna port of the reference signal identified by the one second type index.

In one subembodiment of the above embodiment, the first antenna port and at least one transmitting antenna port of DMRS on a PDSCH where the first radio signal is located are QCL.

In one subembodiment of the above embodiment, the QCL type between the first antenna port and the third antenna port is one of QCL-TypeA, QCL-TypeB, QCL-TypeC and QCL-TypeD.

In one subembodiment of the above embodiment, the QCL type between the first antenna port and the third antenna port is one of QCL-TypeA and QCL-TypeD.

In one embodiment, the phrase that the QCL type between an antenna port and another antenna port is QCL-TypeB refers to: the Doppler spread and Doppler shift of a channel that a radio signal transmitted from the one antenna port goes through can be used to infer the Doppler spread and Doppler shift of a channel that a radio signal transmitted from the another antenna port goes through.

In one embodiment, the phrase that the QCL type between an antenna port and another antenna port is QCL-TypeB refers to: a channel that a radio signal transmitted from the one antenna port goes through and a channel that a radio signal transmitted from the another antenna port goes through have the same Doppler spread and Doppler shift.

In one embodiment, the specific meaning of QCL-TypeB can be found in 3GPP TS38.214, chapter 5.1.5.

In one embodiment, the phrase that the QCL type between an antenna port and another antenna port is QCL-TypeC refers to: the Doppler shift and average delay of a channel that a radio signal transmitted from the one antenna port goes through can be used to infer the Doppler shift and average delay of a channel that a radio signal transmitted from the another antenna port goes through.

In one embodiment, the phrase that the QCL type between an antenna port and another antenna port is QCL-TypeA refers to: a channel that a radio signal transmitted from the one antenna port goes through and a channel that a radio signal transmitted from the another antenna port goes through have the same Doppler shift and average delay.

In one embodiment, the specific meaning of QCL-TypeC can be found in 3GPP TS38.214, chapter 5.1.5.

Embodiment 12

Figure 12:
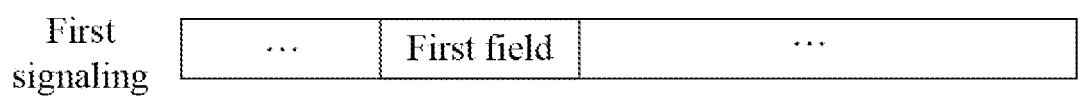
FIG. 12 illustrates a schematic diagram of a first signaling according to one embodiment of the present disclosure.

Embodiment 12 illustrates a schematic diagram of a first signaling; as shown in FIG. 12.

In Embodiment 12, the first signaling comprises scheduling information of the first radio signal in the present disclosure, the first signaling comprises a first field, the first field of the first signaling indicates the first information element in the present disclosure out of the first information set in the present disclosure.

In one embodiment, the first signaling is a physical layer signaling.

In one embodiment, the first signaling is a dynamic signaling.

In one embodiment, the first signaling is a dynamic signaling used for Downlink Grant.

In one embodiment, the first signaling comprises Downlink Control Information (DCI).

In one embodiment, the first signaling comprises Downlink Grant DCI.

In one embodiment, the first signaling is UE-specific.

In one embodiment, a signaling identifier for the first signaling is a Cell-Radio Network Temporary Identifier (C-RNTI).

In one embodiment, the first signaling is DCI identified by a C-RNTI.

In one embodiment, a signaling format for the first signaling is Format 1_1, the specific meaning of the Format 1_1 can be found in 3GPP TS38.212, chapter 7.3.

In one embodiment, the first field of the first signaling explicitly indicates the first information element out of the first information set.

In one embodiment, the first field of the first signaling indicates an index of the first information element in the first information set.

In one embodiment, the first field of the first signaling indicates a first type index comprised in the first information element.

In one embodiment, the first field of the first signaling is Transmission configuration indication field; the specific meaning of the Transmission configuration indication field can be found in 3GPP TS38.212, chapter 7.3.1 and 3GPP TS38.214, chapter 5.1.5.

In one embodiment, the first field of the first signaling comprises part or all of information within Transmission configuration indication field; the specific meaning of the Transmission configuration indication field can be found in 3GPP TS38.212, chapter 7.3.1 and 3GPP TS38.214, chapter 5.1.5.

In one embodiment, the first field of the first signaling comprises 3 bits.

In one embodiment, the first field of the first signaling comprises a fixed number of bits.

In one embodiment, the number of bits comprised in the first field of the first signaling is not related to the first information set.

In one embodiment, the number of bits comprised in the first field of the first signaling is related to the first information set.

In one embodiment, the number of bits comprised in the first field of the first signaling is related to the number of information elements comprised in the first information set.

In one embodiment, the number of bits comprised in the first field of the first signaling is a minimum positive integer not less than the logarithm of N with base 2, the N is the number of information elements comprised in the first information set.

Embodiment 13

Figure 13:
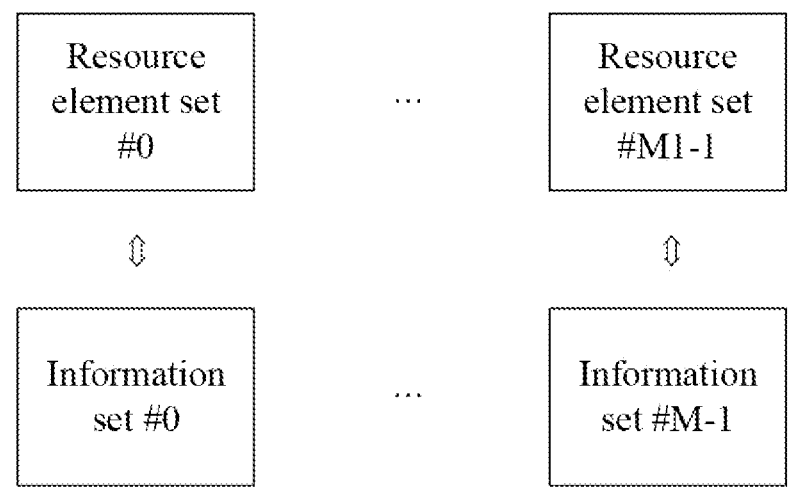
FIG. 13 illustrates a schematic diagram of a correspondence relationship between the M1 resource element sets and the M information sets according to one embodiment of the present disclosure.

Embodiment 13 illustrates a schematic diagram of a correspondence relationship between the M1 resource element sets and the M information sets; as shown in FIG. 13.

In Embodiment 13, the first resource element set in the present disclosure is one resource element set of the M1 resource element sets. The M1 is equal to the M, the M1 resource element sets correspond to the M information sets respectively. In FIG. 13, indices of the M1 resource element sets are #0 . . . , and #M1−1, respectively, while indices of the M information sets are #0 . . . , and #M−1, respectively.

In one embodiment, the first information set in the present disclosure is one of the M information sets that corresponds to the first resource element set.

In one embodiment, the M1 is equal to the M, the M1 resource element sets respectively correspond to the M information sets.

Embodiment 14

Figure 14:
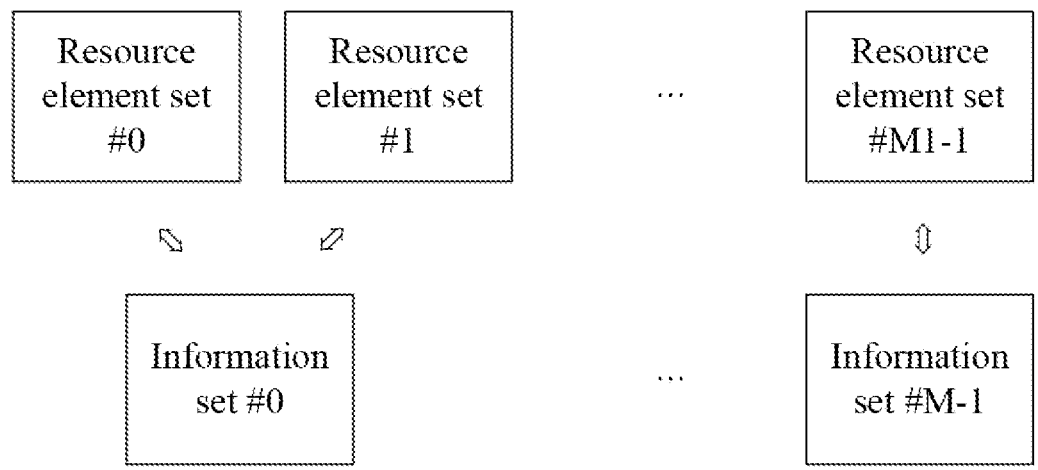
FIG. 14 illustrates a schematic diagram of a correspondence relationship between the M1 resource element sets and the M information sets according to one embodiment of the present disclosure.

Embodiment 14 illustrates a schematic diagram of a correspondence relationship between the M1 resource element sets and the M information sets; as shown in FIG. 14.

In Embodiment 14, the first resource element set in the present disclosure is a resource element set of the M1 resource element sets. Any one resource element set of the M1 resource element sets corresponds to one of the M information sets. The M1 is greater than the M. In FIG. 14, indices of the M1 resource element sets are #0 . . . and #M1−1, respectively, while indices of the M information sets are #0 . . . , and #M−1, respectively.

In one embodiment, the M1 is greater than the M, at least one information set of the M information sets corresponds to multiple resource element sets of the M1 resource element sets.

Embodiment 15

Figure 15:
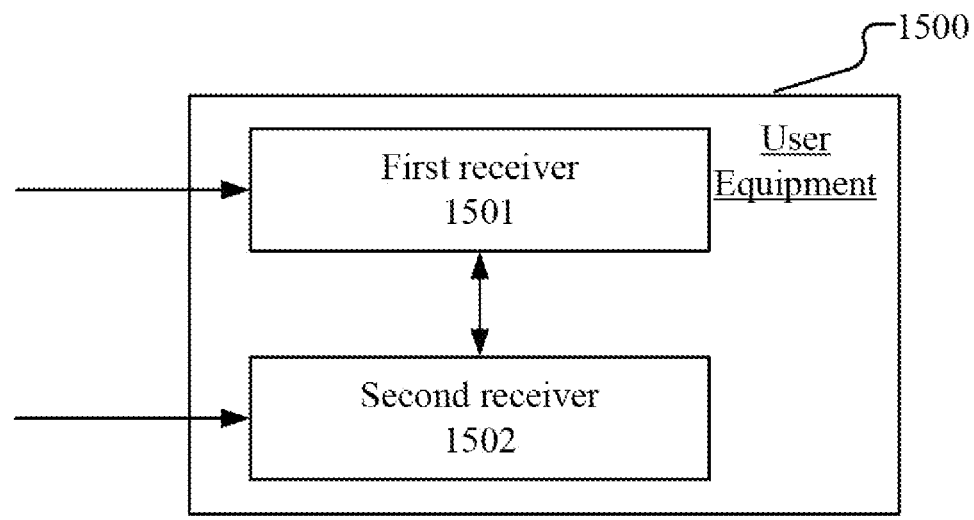
FIG. 15 illustrates a structure block diagram of a processing device in a UE according to one embodiment of the present disclosure.

Embodiment 15 illustrates a structure block diagram of a processing device in a UE; as shown in FIG. 15. In FIG. 15, a processing device 1500 in a UE mainly consists of a first receiver 1501 and a second receiver 1502.

In Embodiment 15, a first receiver 1501 receives a first signaling in a first resource element set; a second receiver 1502 receives a first radio signal.

In Embodiment 15, the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one index or multiple indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the radio signal.

In one embodiment, a number of bits comprised in the first field of the first signaling is related to the first information set.

In one embodiment, at least one transmitting antenna port of the first radio signal and at least one transmitting antenna port of a reference signal identified by a second type index comprised in the first information element are quasi-co-located.

In one embodiment, for any given information set in the M information sets, a number of bits in the first information used for indicating any given first type index in the given information set is less than a number of bits in the first information used for indicating a second type index in a second type index set corresponding to the given first type index.

In one embodiment, the first resource element set is a resource element set of the M1 resource element sets, any resource element set of the M1 resource element sets corresponds to one of the M information sets; the M1 is a positive integer greater than 1.

In one embodiment, the second receiver 1502 further receives first information; wherein the first information indicates the M information sets.

In one embodiment, the second receiver 1502 further receives second information; wherein the second information indicates a correspondence relationship between the M1 resource element sets and the M information sets.

In one embodiment, the first receiver 1501 comprises at least one of the antenna 452, the receiver 454, the receiving processor 456, the multi-antenna receiving processor 458, the controller/processor 459, the memory 460, and the data source 467 in Embodiment 4.

In one embodiment, the second receiver 1502 comprises at least one of the antenna 452, the receiver 454, the receiving processor 456, the multi-antenna receiving processor 458, the controller/processor 459, the memory 460, and the data source 467 in Embodiment 4.

Embodiment 16

Figure 16:
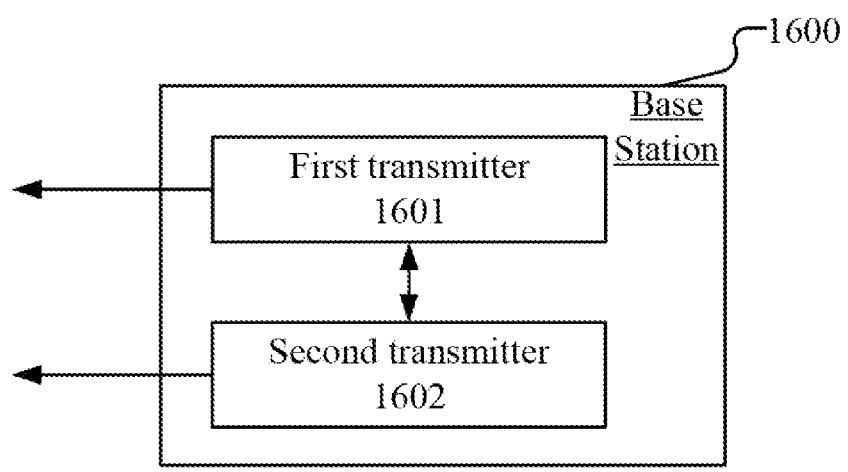
FIG. 16 illustrates a structure block diagram of a processing device in a base station according to one embodiment of the present disclosure.

Embodiment 16 illustrates a structure block diagram of a processing device in a base station, as shown in FIG. 16. In FIG. 16, a processing device 1600 in a base station mainly consists of a first transmitter 1601 and a second transmitter 1602.

In Embodiment 16, a first transmitter 1601 transmits a first signaling in a first resource element set; a second transmitter 1602 transmits a first radio signal.

In Embodiment 16, the first resource element set is used for determining a first information set out of M information sets; the first resource element set comprises a positive integer number of resource element(s); any information set of the M information sets comprises a positive integer number of information element(s), any information element of the integer number of information element(s) comprises a first type index and a second type index set, a second type index set comprises one index or multiple indices, the M is a positive integer greater than 1; the first signaling comprises scheduling information of the first radio signal, the first signaling comprises a first field, the first field of the first signaling indicates a first information element out of the first information set; a measurement on a reference signal identified by a second type index comprised in the first information element is used for reception of the radio signal.

In one embodiment, a number of bits comprised in the first field of the first signaling is related to the first information set.

In one embodiment, at least one transmitting antenna port of the first radio signal and at least one transmitting antenna port of a reference signal identified by a second type index comprised in the first information element are quasi-colocated.

In one embodiment, for any given information set in the M information sets, a number of bits in the first information used for indicating any given first type index in the given information set is less than a number of bits in the first information used for indicating a second type index in a second type index set corresponding to the given first type index.

In one embodiment, the first resource element set is a resource element set of the M1 resource element sets, any resource element set of the M1 resource element sets corresponds to one of the M information sets; the M1 is a positive integer greater than 1.

In one embodiment, the second transmitter 1602 further transmits first information; wherein the first information indicates the M information sets.

In one embodiment, the second transmitter 1602 further transmits second information; wherein the second information indicates a correspondence relationship between the M1 resource element sets and the M information sets.

In one embodiment, the first transmitter 1601 comprises at least one of the antenna 420, the transmitter 418, the transmitting processor 416, the multi-antenna transmitting processor 471, the controller/processor 475, and the memory 476 in Embodiment 4.

In one embodiment, the second transmitter 1602 comprises at least one of the antenna 420, the transmitter 418, the transmitting processor 416, the multi-antenna transmitting processor 471, the controller/processor 475, and the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A method in a User Equipment (UE) for wireless communication, comprising:
  receiving a first signaling in a first resource element set, the first signaling comprises downlink control information; and
  receiving a first radio signal after having received the first signaling;
  wherein the first resource element set is a control resource set; the first resource element set is used for determining a first information set out of M information sets; wherein M is equal to 2; the first resource element set comprises a positive integer number of resource element(s); any information set of the M information sets comprises a positive integer number of information element(s), any information element in the M information sets is a transmission configuration indication state; any information element of the integer number of information element(s) comprises a first type index and a second type index set, a second type index set comprises one second type index or multiple second type indices; the first signaling comprises scheduling information of the first radio signal, the first radio signal is transmitted on a physical downlink shared channel (PDSCH); the first signaling further comprises a first field, the first field of the first signaling indicates a first information element out of the first information set; a measurement on a reference signal identified by a second type index comprised in the first information element is used for reception of the first radio signal; any one transmitting antenna port of a reference signal identified by a second type index comprised in the first information element and at least one transmitting antenna port of DMRS of the PDSCH over which the first radio signal is transmitted are Quasi Co-Located;
receiving first information prior to having received the first signaling, wherein the first information indicates the M information sets; the first information comprises M pieces of first sub-information, the M pieces of first sub-information are carried by M signalings respectively, and the first information is carried by MAC CE signalings, the M pieces of first sub-information respectively indicate the M information sets;
a second type index set comprised in the first information element comprises two second type indices, the two second type indices identify two reference signals respectively; a first antenna port is a transmitting antenna port of one of the two reference signals, a second antenna port is a transmitting antenna port of the other of the two reference signals, a third antenna port is a transmitting antenna port of the first radio signal; the third antenna port and the first antenna port are Quasi Co-Located, and the third antenna port and the second antenna port are Quasi Co-Located, the QCL type between the third antenna port and the first antenna port is different from the QCL type between the third antenna port and the second antenna port; the QCL type between the third antenna port and the first antenna port is QCL-TypeD, and the QCL type between the third antenna port and the second antenna port is QCL-TypeA;
or, a second type index set comprised in the first information element only comprises one second type index; a first antenna port is a transmitting antenna port of a reference signal identified by the one second type index, a third antenna port is a transmitting antenna port of the first radio signal; the first antenna port and the third antenna port are Quasi Co-Located; the QCL type between the first antenna port and the third antenna port is one of QCL-TypeA and QCL-TypeD.

2. The method according to claim 1, wherein a number of information elements comprised in any information set of the M information sets is no greater than 8;
or, the first field of the first signaling comprises 3 bits;
or, the first field of the first signaling comprises a fixed number of bits;
or, the number of bits comprised in the first field of the first signaling is not related to the first information set;
or, a time interval between an end time for time resources occupied by the first signaling and a start time for time resources occupied by the first radio signal is not less than a first threshold, the first threshold is a non-negative integer.

3. The method according to claim 1, comprising:
receiving second information,
wherein the first resource element set is a resource element set of M1 resource element sets, any resource element set of the M1 resource element sets corresponds to an information set of the M information sets, the M1 is a positive integer greater than 1, the second information indicates a correspondence relationship between the M1 resource element sets and the M information sets; any resource element set of the M1 resource element sets is a CORESET.

4. The method according to claim 3, wherein at least two resource element sets in the M1 resource element sets correspond to different information sets in the M information sets;
or, the second information is carried by one RRC signaling;
or, the second information comprises M pieces of second sub-information, the M pieces of second sub-information are carried by M signalings respectively, and the second information is carried by MAC CE signalings; the M pieces of second sub-information respectively correspond to the M information sets, any piece of second sub-information in the M pieces of second sub-information indicates a resource element set/resource element sets of the M1 resource element sets that corresponds/correspond to a corresponding information set; the M pieces of first sub-information respectively correspond to the M pieces of second sub-information, the corresponding first sub-information and second sub-information are carried by a same signaling.

5. A method in a base station for wireless communication, comprising:
transmitting a first signaling in a first resource element set, the first signaling comprises downlink control information; and
transmitting a first radio signal after having transmitted the first signaling;
wherein the first resource element set is a control resource set; the first resource element set is used for determining a first information set out of M information sets, wherein M is equal to 2; the first resource element set comprises a positive integer number of resource element(s); any information set of the M information sets comprises a positive integer number of information element(s), any information element in the M information sets is a transmission configuration indication state; any information element of the integer number of information element(s) further comprises a first type index and a second type index set, a second type index set comprises one second type index or multiple second type indices; the first signaling comprises scheduling information of the first radio signal, the first radio signal is transmitted on a physical downlink shared channel (PDSCH); the first signaling further comprises a first field, the first field of the first signaling indicates a first information element out of the first information set; a measurement on a reference signal identified by a second type index comprised in the first information element is used for reception of the first radio signal; any one transmitting antenna port of a reference signal identified by a second type index comprised in the first information element and at least one transmitting antenna port of DMRS of the PDSCH over which the first radio signal is transmitted are Quasi Co-Located;
transmitting first information prior to having transmitted the first signaling, wherein the first information indicates the M information sets; the first information comprises M pieces of first sub-information, the M pieces of first sub-information are carried by M signalings respectively, and the first information is carried by MAC CE signalings, the M pieces of first sub-information respectively indicate the M information sets;
a second type index set comprised in the first information element comprises two second type indices, the two second type indices identify two reference signals respectively; a first antenna port is a transmitting antenna port of one of the two reference signals, a second antenna port is a transmitting antenna port of the other of the two reference signals, a third antenna port is a transmitting antenna port of the first radio signal; the third antenna port and the first antenna port are Quasi Co-Located, and the third antenna port and the second antenna port are Quasi Co-Located, the QCL type between the third antenna port and the first antenna port is different from the QCL type between the third antenna port and the second antenna port; the QCL type between the third antenna port and the first antenna port is QCL-TypeD, and the QCL type between the third antenna port and the second antenna port is QCL-TypeA;

or, a second type index set comprised in the first information element only comprises one second type index; a first antenna port is a transmitting antenna port of a reference signal identified by the one second type index, a third antenna port is a transmitting antenna port of the first radio signal; the first antenna port and the third antenna port are Quasi Co-Located; the QCL type between the first antenna port and the third antenna port is one of QCL-TypeA and QCL-TypeD.

6. The method according to claim 5, wherein a number of information elements comprised in any information set of the M information sets is no greater than 8;

or, the first field of the first signaling comprises 3 bits;

or, the first field of the first signaling comprises a fixed number of bits;

or, the number of bits comprised in the first field of the first signaling is not related to the first information set;

or, a time interval between an end time for time resources occupied by the first signaling and a start time for time resources occupied by the first radio signal is not less than a first threshold, the first threshold is a non-negative integer.

7. The method according to claim 5, comprising:
transmitting second information,
wherein the first resource element set is a resource element set of M1 resource element sets; any resource element set of the M1 resource element sets corresponds to an information set of the M information sets, the M1 is a positive integer greater than 1, the second information indicates a correspondence relationship between the M1 resource element sets and the M information sets; any resource element set of the M1 resource element sets is a CORESET.

8. The method according to claim 7, wherein at least two resource element sets in the M1 resource element sets correspond to different information sets in the M information sets;

or, the second information is carried by one RRC signaling;

or, the second information comprises M pieces of second sub-information, the M pieces of second sub-information are carried by M signalings respectively, and the second information is carried by MAC CE signalings; the M pieces of second sub-information respectively correspond to the M information sets, any piece of second sub-information in the M pieces of second sub-information indicates a resource element set/resource element sets of the M1 resource element sets that corresponds/correspond to a corresponding information set; the M pieces of first sub-information respectively correspond to the M pieces of second sub-information, the corresponding first sub-information and second sub-information are carried by a same signaling.

9. A User Equipment (UE) for wireless communication, comprising:
a first receiver, receiving a first signaling in a first resource element set, the first signaling comprises downlink control information; and
a second receiver, receiving a first radio signal after the first receiver having received the first signaling;
wherein the first resource element set is a control resource set; the first resource element set is used for determining a first information set out of M information sets, wherein M is equal to 2; the first resource element set comprises a positive integer number of resource element(s); any information set of the M information sets comprises a positive integer number of information element(s), any information element in the M information sets is a transmission configuration indication state; any information element of the integer number of information element(s) further comprises a first type index and a second type index set, a second type index set comprises one second type index or multiple second type indices; the first signaling comprises scheduling information of the first radio signal, the first radio signal is transmitted on a physical downlink shared channel (PDSCH); the first signaling further comprises a first field, the first field of the first signaling indicates a first information element out of the first information set; a measurement on a reference signal identified by a second type index comprised in the first information element is used for reception of the first radio signal; any one transmitting antenna port of a reference signal identified by a second type index comprised in the first information element and at least one transmitting antenna port of DMRS of the PDSCH over which the first radio signal is transmitted are Quasi Co-Located; the second receiver receives first information prior to the first receiver received the first signaling, wherein the first information indicates the M information sets; the first information comprises M pieces of first sub-information, the M pieces of first sub-information are carried by M signalings respectively, and the first information is carried by MAC CE signalings, the M pieces of first sub-information respectively indicate the M information sets;

a second type index set comprised in the first information element comprises two second type indices, the two second type indices identify two reference signals respectively; a first antenna port is a transmitting antenna port of one of the two reference signals, a second antenna port is a transmitting antenna port of the other of the two reference signals, a third antenna port is a transmitting antenna port of the first radio signal; the third antenna port and the first antenna port are Quasi Co-Located, and the third antenna port and the second antenna port are Quasi Co-Located, the QCL type between the third antenna port and the first antenna port is different from the QCL type between the third antenna port and the second antenna port; the QCL type between the third antenna port and the first antenna port is QCL-TypeD, and the QCL type between the third antenna port and the second antenna port is QCL-TypeA;

or, a second type index set comprised in the first information element only comprises one second type index; a first antenna port is a transmitting antenna port of a reference signal identified by the one second type index, a third antenna port is a transmitting antenna port of the first radio signal; the first antenna port and the third antenna port are Quasi Co-Located; the QCL type between the first antenna port and the third antenna port is one of QCL-TypeA and QCL-TypeD.

10. The UE according to claim 9, wherein a number of information elements comprised in any information set of the M information sets is no greater than 8;

or, the first field of the first signaling comprises 3 bits;

or, the first field of the first signaling comprises a fixed number of bits;

or, the number of bits comprised in the first field of the first signaling is not related to the first information set;

or, a time interval between an end time for time resources occupied by the first signaling and a start time for time resources occupied by the first radio signal is not less than a first threshold, the first threshold is a non-negative integer.

11. The UE according to claim 9, wherein the second receiver receives second information, wherein the first resource element set is a resource element set of M1 resource element sets; any resource element set of the M1 resource element sets corresponds to an information set of the M information sets, the M1 is a positive integer greater than 1, the second information indicates a correspondence relationship between the M1 resource element sets and the M information sets; any resource element set of the M1 resource element sets is a CORESET.

12. The UE according to claim 11, wherein at least two resource element sets in the M1 resource element sets correspond to different information sets in the M information sets;
or, the second information is carried by one RRC signaling;
or, the second information comprises M pieces of second sub-information, the M pieces of second sub-information are carried by M signalings respectively, and the second information is carried by MAC CE signalings; the M pieces of second sub-information respectively correspond to the M information sets, any piece of second sub-information in the M pieces of second sub-information indicates a resource element set/resource element sets of the M1 resource element sets that corresponds/correspond to a corresponding information set; the M pieces of first sub-information respectively correspond to the M pieces of second sub-information, the corresponding first sub-information and second sub-information are carried by a same signaling.

13. A base station for wireless communication, comprising:
a first transmitter, transmitting a first signaling in a first resource element set, the first signaling comprises downlink control information; and
a second transmitter, transmitting a first radio signal after the first transmitter having transmitted the first signaling;
wherein the first resource element set is a control resource set; the first resource element set is used for determining a first information set out of M information sets, wherein M is equal to 2; the first resource element set comprises a positive integer number of resource element(s); any information set of the M information sets comprises a positive integer number of information element(s), any information element in the M information sets is a transmission configuration indication state; any information element of the integer number of information element(s) further comprises a first type index and a second type index set, a second type index set comprises one second type index or multiple second type indices; the first signaling comprises scheduling information of the first radio signal, the first radio signal is transmitted on a physical downlink shared channel (PDSCH); the first signaling further comprises a first field, the first field of the first signaling indicates a first information element out of the first information set; a measurement on a reference signal identified by a second type index comprised in the first information element is used for reception of the first radio signal; any one transmitting antenna port of a reference signal identified by a second type index comprised in the first information element and at least one transmitting antenna port of DMRS of the PDSCH over which the first radio signal is transmitted are Quasi Co-Located; the second transmitter transmits first information prior to the first transmitter transmitted the first signaling, wherein the first information indicates the M information sets; the first information comprises M pieces of first sub-information, the M pieces of first sub-information are carried by M signalings respectively, and the first information is carried by MAC CE signalings, the M pieces of first sub-information respectively indicate the M information sets;
a second type index set comprised in the first information element comprises two second type indices, the two second type indices identify two reference signals respectively; a first antenna port is a transmitting antenna port of one of the two reference signals, a second antenna port is a transmitting antenna port of the other of the two reference signals, a third antenna port is a transmitting antenna port of the first radio signal; the third antenna port and the first antenna port are Quasi Co-Located, and the third antenna port and the second antenna port are Quasi Co-Located, the QCL type between the third antenna port and the first antenna port is different from the QCL type between the third antenna port and the second antenna port; the QCL type between the third antenna port and the first antenna port is QCL-TypeD, and the QCL type between the third antenna port and the second antenna port is QCL-TypeA;
or, a second type index set comprised in the first information element only comprises one second type index; a first antenna port is a transmitting antenna port of a reference signal identified by the one second type index, a third antenna port is a transmitting antenna port of the first radio signal; the first antenna port and the third antenna port are Quasi Co-Located; the QCL type between the first antenna port and the third antenna port is one of QCL-TypeA and QCL-TypeD.

14. The base station according to claim 13, wherein a number of information elements comprised in any information set of the M information sets is no greater than 8;
or, the first field of the first signaling comprises 3 bits;
or, the first field of the first signaling comprises a fixed number of bits;
or, the number of bits comprised in the first field of the first signaling is not related to the first information set;
or, a time interval between an end time for time resources occupied by the first signaling and a start time for time resources occupied by the first radio signal is not less than a first threshold, the first threshold is a non-negative integer.

15. The base station according to claim 13, wherein the second transmitter transmits second information, wherein the first resource element set is a resource element set of M1 resource element sets; any resource element set of the M1 resource element sets corresponds to an information set of the M information sets, the M1 is a positive integer greater than 1, the second information indicates a correspondence relationship between the M1 resource element sets and the M information sets; any resource element set of the M1 resource element sets is a CORESET.

16. The base station according to claim 15, wherein at least two resource element sets in the M1 resource element sets correspond to different information sets in the M information sets;
or, the second information is carried by one RRC signaling;
or, the second information comprises M pieces of second sub-information, the M pieces of second sub-information are carried by M signalings respectively, and the second information is carried by MAC CE signalings; the M pieces of second sub-information respectively correspond to the M information sets, any piece of second sub-information in the M pieces of second sub-information indicates a resource element set/resource element sets of the M1 resource element sets that corresponds/correspond to a corresponding information set; the M pieces of first sub-information respectively correspond to the M pieces of second sub-information, the corresponding first sub-information and second sub-information are carried by a same signaling.

* * * * *